United States Patent
Liao et al.

(10) Patent No.: US 11,495,963 B2
(45) Date of Patent: Nov. 8, 2022

(54) ELECTROSTATIC DISCHARGE PROTECTION CIRCUIT HAVING TIME-EXTENDED DISCHARGING MECHANISM

(71) Applicant: REALTEK SEMICONDUCTOR CORPORATION, Hsinchu (TW)

(72) Inventors: Shih-Hsin Liao, Hsinchu (TW); Jyun-Ren Chen, Hsinchu (TW); Tay-Her Tsaur, Hsinchu (TW); Po-Ching Lin, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/327,808

(22) Filed: May 24, 2021

(65) Prior Publication Data
US 2022/0158445 A1 May 19, 2022

(30) Foreign Application Priority Data
Nov. 18, 2020 (TW) .................. 109140342

(51) Int. Cl.
*H02H 9/04* (2006.01)
(52) U.S. Cl.
CPC .................. *H02H 9/046* (2013.01)
(58) Field of Classification Search
CPC .................................................... H02H 9/046
USPC .......................................................... 361/56
See application file for complete search history.

(56) References Cited

U.S. PATENT DOCUMENTS

| | | | | |
|---|---|---|---|---|
| 5,208,719 A | * | 5/1993 | Wei | H03K 19/00315 361/111 |
| 7,012,794 B2 | * | 3/2006 | Le | H03K 17/6872 361/91.1 |
| 11,164,860 B2 | * | 11/2021 | Chen | H01L 27/0288 |
| 2013/0100561 A1 | * | 4/2013 | Senouci | H02H 9/046 327/564 |

* cited by examiner

*Primary Examiner* — Dharti H Patel
(74) *Attorney, Agent, or Firm* — WPAT, PC

(57) ABSTRACT

The present invention discloses an electrostatic discharge protection circuit having time-extended discharging mechanism. A RC circuit is coupled between an ESD input terminal that receives an ESD input and a ground terminal and includes an input control terminal. An inverter includes a P-type transistor coupled between the ESD input terminal and an output control terminal and an N-type transistor circuit including N-type transistors coupled in series and between the output control terminal and a ground terminal, wherein two of the N-type transistors has an internal connection terminal. Gates of the P-type transistor and N-type transistors are controlled by the input control terminal. A switch transistor is coupled between the ESD input terminal and the internal connection terminal. A discharging transistor is coupled between the ESD input terminal and the ground terminal. The gates of the switch transistor and the discharging transistor are controlled by the output control terminal.

9 Claims, 6 Drawing Sheets

ELECTROSTATIC DISCHARGE PROTECTION CIRCUIT HAVING TIME-EXTENDED DISCHARGING MECHANISM

BACKGROUND OF THE INVENTION

1. Field of the Invention

The present invention relates to an electrostatic discharge protection circuit having time-extended discharging mechanism.

2. Description of Related Art

Electrostatic discharge (ESD) causes permanent damage to electronic components and equipments and affects functions of integrated circuits such that the products are unable to work normally.

Electrostatic discharge may occur during manufacturing, packaging, testing, storage and transportation of the chips. In order to prevent the damage of the electrostatic discharge, the integrated circuit product can be equipped with an electrostatic discharge protection component or circuit and have a test performed thereon to enhance the protection of the integrated circuit from the electrostatic discharge and further increase the yield rate of the electronic products.

SUMMARY OF THE INVENTION

In consideration of the problem of the prior art, an object of the present invention is to provide a signal enhancement relay apparatus and a signal enhancement relay method.

The present invention discloses an electrostatic discharge protection circuit having time-extended discharging mechanism that includes a RC circuit, an inverter, a switch transistor and a discharging transistor. The RC circuit is electrically coupled between a ESD input terminal and a ground terminal and includes an input control terminal, wherein a voltage level of the ESD input terminal is predetermined to be at a low state level and is configured to receive an ESD input. The inverter includes a P-type transistor and an N-type transistor circuit. The P-type transistor is electrically coupled between the ESD input terminal and an output control terminal. The N-type transistor circuit includes a plurality of N-type transistors electrically coupled in series between the output control terminal and the ground terminal, wherein two of the N-type transistors comprise an internal connection terminal, and a gate of each of the P-type transistor and the N-type transistors is controlled by the input control terminal. The switch transistor is electrically coupled between the ESD input terminal and the internal connection terminal. The discharging transistor is electrically coupled between the ESD input terminal and the ground terminal, wherein a gate of each of the switch transistor and the discharging transistor is controlled by the output control terminal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an electrostatic discharge protection circuit having time-extended discharging mechanism, by disposing the switch transistor, to extend the time that the discharging transistor turns on when the state of the voltage level of the input control terminal of the RC (resistor-capacitor) circuit transits after the predetermined time. A longer time of the discharging activity performed on the ESD input terminal can be obtained.

Figure 1:
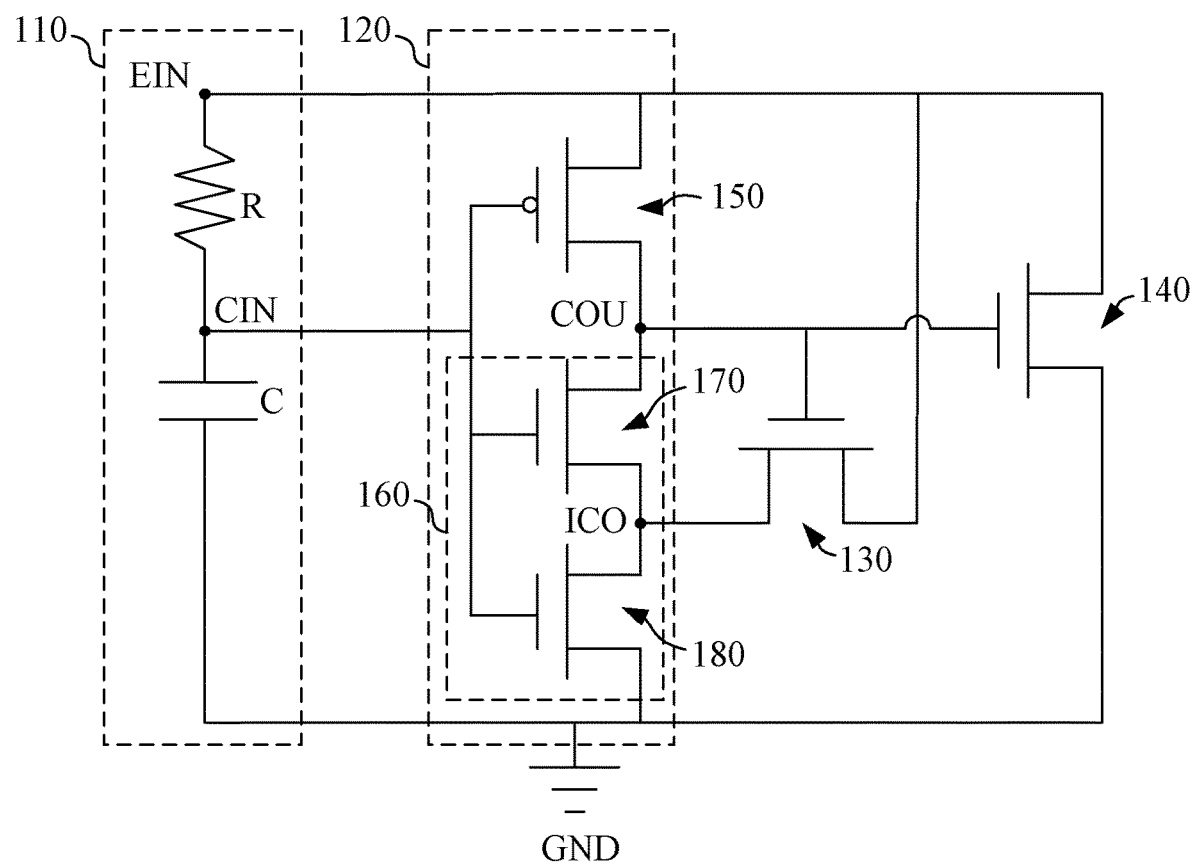
FIG. 1 illustrates a circuit diagram of an electrostatic discharge protection circuit having time-extended discharging mechanism according to an embodiment of the present invention.

Reference is now made to FIG. 1. FIG. 1 illustrates a circuit diagram of an electrostatic discharge protection circuit 100 having time-extended discharging mechanism according to an embodiment of the present invention. The electrostatic discharge protection circuit 100 includes a RC circuit 110, an inverter 120, a switch transistor 130 and a discharging transistor 140.

The RC circuit 110 is electrically coupled between an ESD input terminal EIN and a ground terminal GND and includes an input control terminal CIN. The RC circuit 110 includes a resistor R and a capacitor C. The resistor R is electrically coupled between the ESD input terminal EIN and the input control terminal CIN. The capacitor C is electrically coupled between the input control terminal CIN and the ground terminal GND.

In different embodiments, the resistor R can be such as, but not limited to a transistor resistor, a poly-Si resistor or an N-type well resistor. The capacitor C can be such as, but not limited to a normal capacitor, a metal-oxide-semiconductor capacitor, a metal-oxide-metal capacitor or a metal-insulator-metal capacitor. However, the present invention is not limited thereto.

The inverter 120 includes a P-type transistor 150 and an N-type transistor circuit 160. The P-type transistor 150 is electrically coupled between ESD input terminal EIN and an output control terminal COU. The N-type transistor circuit 160 includes an N-type transistor 170 and an N-type transistor 180 electrically coupled in series between the output control terminal COU and the ground terminal GND. The N-type transistor 170 and the N-type transistor 180 include an internal connection terminal ICO therebetween. A gate of each of the P-type transistor 150, the N-type transistor 170 and the N-type transistor 180 is controlled by the input control terminal CIN.

The switch transistor 130 is electrically coupled between the ESD input terminal EIN and the internal connection terminal ICO. The discharging transistor 140 is electrically coupled between the ESD input terminal EIN and the ground terminal GND. A gate of each of the switch transistor 130 and the discharging transistor 140 is controlled by the output control terminal COU. In the present embodiment, each of the switch transistor 130 and the discharging transistor 140 is single N-type transistor, such as but not limited to an N-type metal oxide semiconductor (NMOS) transistor or an NPN bipolar junction transistor (BJT).

The operation of the electrostatic discharge protection circuit 100 is described in detail in the following paragraphs.

Figure 2:
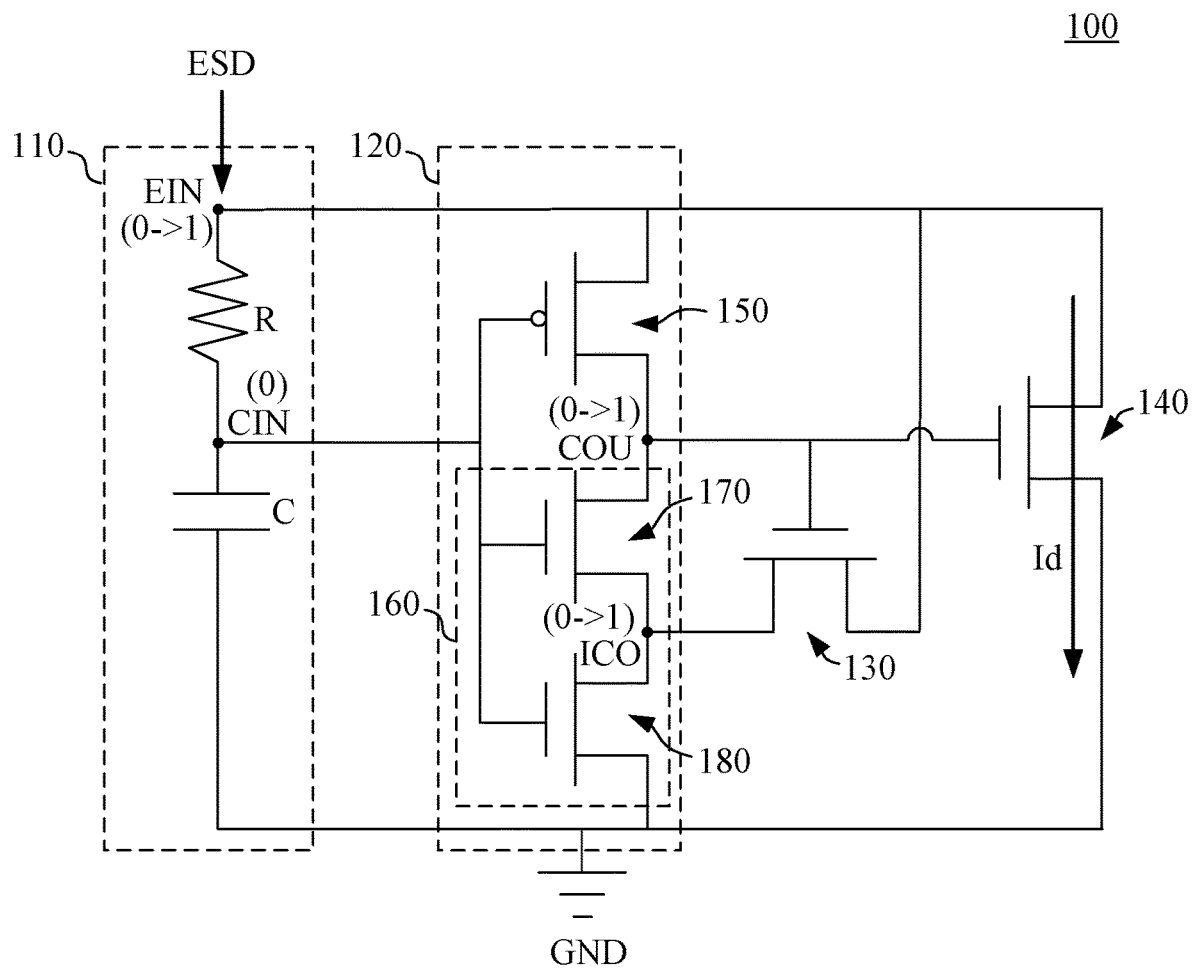
FIG. 2 illustrates a circuit diagram of the electrostatic discharge protection circuit under the condition that an ESD input is received according to an embodiment of the present invention.

Reference is now made to FIG. 2. FIG. 2 illustrates a circuit diagram of the electrostatic discharge protection circuit 100 under the condition that an ESD input ESD is received according to an embodiment of the present invention.

When the ESD input terminal EIN does not receive the ESD input ESD, a voltage level of the ESD input terminal EIN is predetermined to be at a low state level. Under such a condition, the RC circuit 110 electrically coupled to the ESD input terminal EIN makes a voltage level of the input control terminal CIN to be at the low state level since the voltage level of the ESD input terminal EIN is at the low state level.

When the ESD input terminal EIN receives the ESD input ESD, the voltage level of the ESD input terminal EIN increases from the low state level to a high state level (marked as 0→1 in FIG. 2). Under such a condition, the RC circuit 110 keeps the voltage level of the input control terminal CIN at the low state level within a predetermined time (marked as 0 in FIG. 2). More specifically, though the resistor R of the RC circuit 110 is electrically coupled to the ESD input terminal EIN, it takes time to charge the capacitor C to further increase the voltage level of the input control terminal CIN.

As a result, within the predetermined time, the voltage level of the input control terminal CIN is at the low state level since the voltage level does not reach the transition point. In an embodiment, the predetermined time is determined by a time constant of the resistor R and the capacitor C. In an embodiment, the time that takes the electrostatic discharge input ESD to increase the voltage level of the ESD input terminal EIN to the high state level is several nanoseconds (ns). The time that takes the RC circuit 110 to increase the input control terminal CIN to the high state level is several microseconds (μs).

The input control terminal CIN having the low state level makes the voltage level of the output control terminal COU increase to the high state level through the inverter 120 (marked as 0→1 in FIG. 2). More specifically, the input control terminal CIN turns on the P-type transistor 150 and turns off the N-type transistor circuit 160. The P-type transistor 150 that is turned on makes ESD input terminal EIN having the high state level charges the output control terminal COU and increases the voltage level of the output control terminal COU to the high state level (marked as 0→1 in FIG. 2).

The output control terminal COU having the high state level turns on the switch transistor 130 and the discharging transistor 140 at the same time.

The switch transistor 130 that is turned on makes the ESD input terminal EIN having the high state level charges the internal connection terminal ICO between the N-type transistor 170 and the N-type transistor 180. As a result, the voltage level of the internal connection terminal ICO increases to the high state level (marked as 0→1 in FIG. 2) to turn off the N-type transistor circuit 160 and further keep the voltage level of the output control terminal COU to be at the high state level.

The discharging transistor 140 that is turned on generates such as, but not limited to a current Id to discharge the ESD input terminal EIN to the ground terminal GND.

Figure 3:
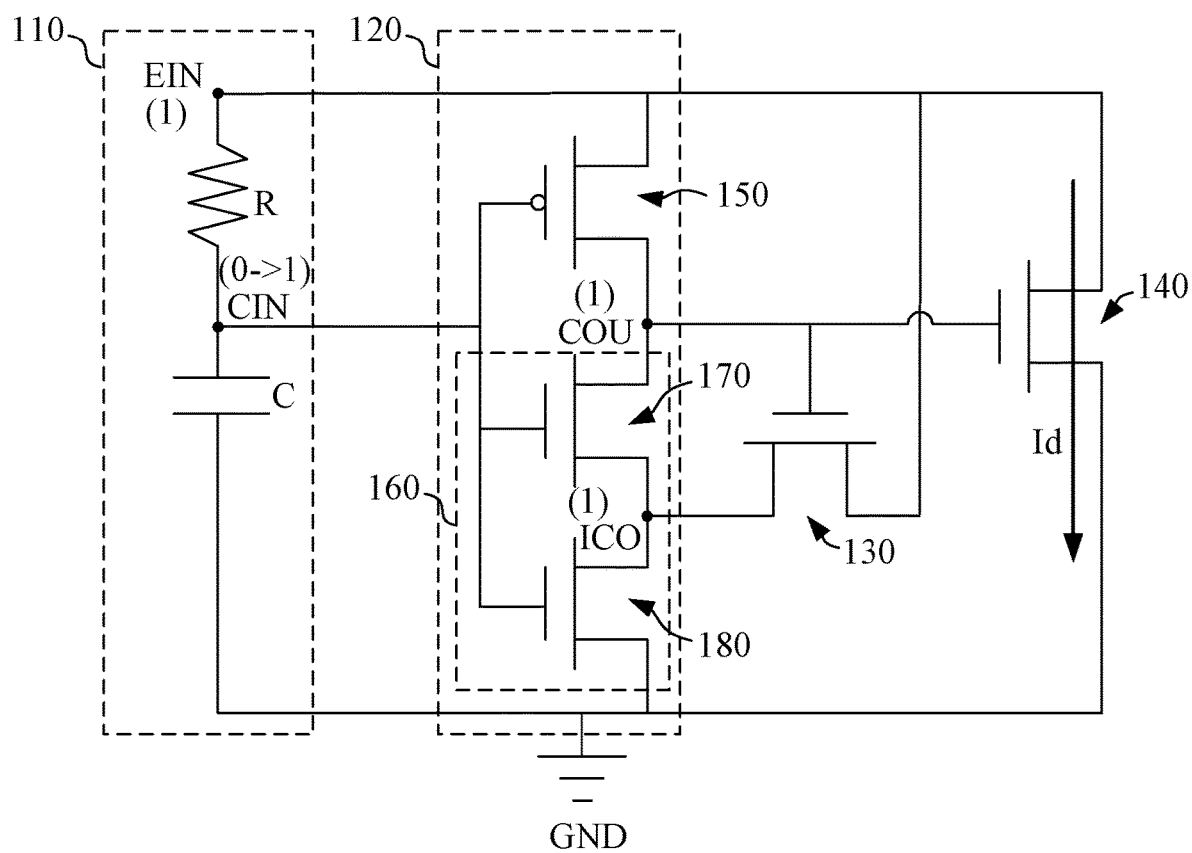
FIG. 3 illustrates a circuit diagram of the electrostatic discharge protection circuit under the condition after the predetermined time that the ESD input is received according to an embodiment of the present invention.

Reference is now made to FIG. 3. FIG. 3 illustrates a circuit diagram of the electrostatic discharge protection circuit 100 under the condition after the predetermined time that the ESD input ESD is received according to an embodiment of the present invention.

After the predetermined time, the voltage level of the input control terminal CIN increases to the high state level (marked as 0→1 in FIG. 3). The input control terminal CIN having the high state level turns off the P-type transistor 150. Further, the input control terminal CIN having the high state level is supposed to turn on the N-type transistor circuit 160.

However, the switch transistor 130 is still turned on under such a condition to make the ESD input terminal EIN having the high state level to charge the internal connection terminal ICO between the N-type transistor 170 and the N-type transistor 180, such that the voltage level of the internal connection terminal ICO is kept to be at the high state level (marked as 1 in FIG. 3). As a result, though the voltage level of the input control terminal CIN is at the high state level, the N-type transistor circuit 160 still turns off since the internal connection terminal ICO that is kept to be at the high state level turns off the N-type transistor 170, in which the voltage difference between the gate and the source of the N-type transistor 170 is not large enough.

The N-type transistor circuit 160 that is turned off keeps the voltage level of the output control terminal COU to be at the high state level (marked as 1 in FIG. 3) such that the discharging transistor 140 is kept to be turned on to generate the current Id to discharge the ESD input terminal EIN.

Figure 4:
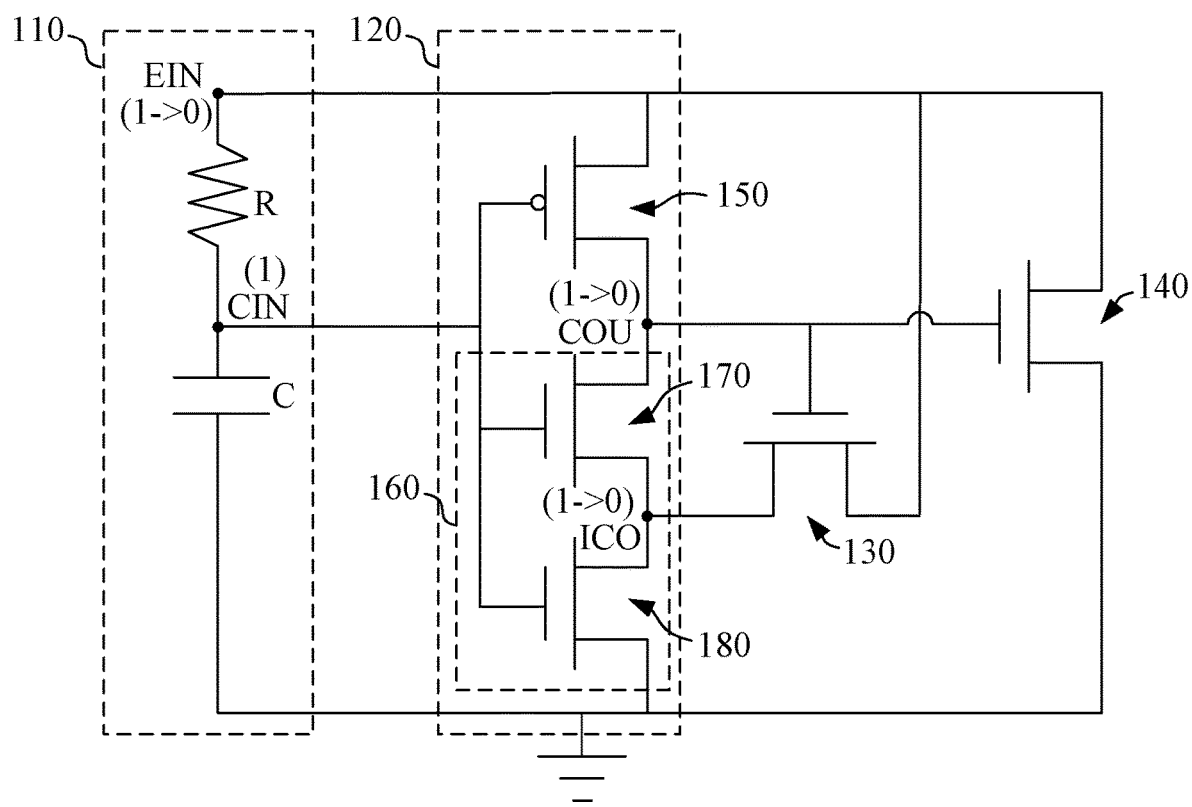
FIG. 4 illustrates a circuit diagram of the electrostatic discharge protection circuit under the condition after the discharging transistor finishes discharging the ESD input terminal according to an embodiment of the present invention.

Reference is now made to FIG. 4. FIG. 4 illustrates a circuit diagram of the electrostatic discharge protection circuit 100 under the condition after the discharging transistor 140 finishes discharging the ESD input terminal EIN according to an embodiment of the present invention.

When the voltage level of the ESD input terminal EIN is discharged to be at the low state level (marked as 1→0 in FIG. 4), the ESD input terminal EIN is not able to charge the internal connection terminal ICO through the switch transistor 130. The input control terminal CIN having the high state level (marked as 1 in FIG. 4) turns on the N-type transistor 180 to discharge the internal connection terminal ICO such that the voltage level of the internal connection terminal ICO decrease from the high state level to the low state level (marked as 1→0 in FIG. 4).

The internal connection terminal ICO that is unable to keep the voltage level to be at the high state level turns on the N-type transistor 170 since the voltage difference between the gate and the source of the N-type transistor 170 is larger than the threshold voltage thereof. The N-type transistor circuit 160 that is turned on further makes the voltage level of the output control terminal COU decreases to the low state level (marked as 1→0 in FIG. 4), so as to turn off the discharging transistor 140 and the switch transistor 130.

In an embodiment, the voltage level of the input control terminal CIN of the RC circuit 110 decreases to the low state level after a period of time due to the discharging activity of the capacitor C (not illustrated in the figure). The state of the RC circuit 110 is restored to the state that the ESD input ESD is not received.

In some approaches, after the state of the voltage level of the input control terminal of the RC circuit transits in the predetermined time, the state of the voltage level of the output control terminal also transits. The discharging transistor turns off earlier and is not able to fully discharge the ESD input terminal.

On the contrary, the electrostatic discharge protection circuit 100 of the present invention, by disposing the switch transistor 130, is able to extend the time that the discharging transistor 140 turns on when the state of the voltage level of the input control terminal CIN of the RC circuit 110 transits after the predetermined time. A longer time of the discharging activity performed on the ESD input terminal EIN can be obtained.

Figure 5:
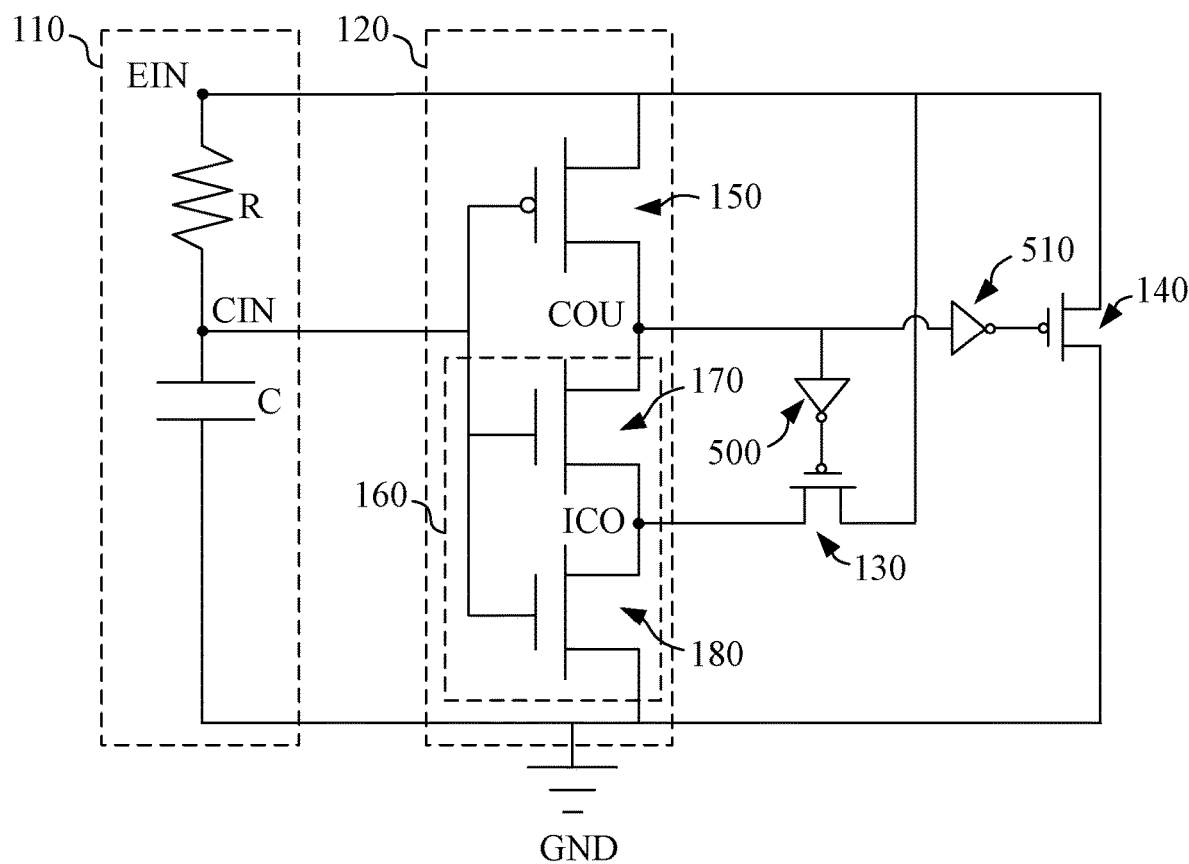
FIG. 5 illustrates a circuit diagram of the electrostatic discharge protection circuit having time-extended discharging mechanism according to another embodiment of the present invention.

It is appreciated that some components in the embodiments described above can be replaced by other components under the condition that the operation of the electrostatic discharge protection circuit 100 is not affected. Please refer to FIG. 5. FIG. 5 illustrates a circuit diagram of the electrostatic discharge protection circuit 100 having time-extended discharging mechanism according to another embodiment of the present invention. The electrostatic discharge protection circuit 100 also includes a RC circuit 110, an inverter 120, a switch transistor 130 and a discharging transistor 140. For example, in an embodiment, the switch transistor 130 may include a P-type transistor that is electrically coupled to the output control terminal COU through an additional inverter 500 illustrated in FIG. 5, in which the P-type transistor can be a PMOS transistor or a PNP BJT transistor.

Similarly, in an embodiment, discharging transistor 140 may include a P-type transistor that is electrically coupled to the output control terminal COU through an additional inverter 510 illustrated in FIG. 5, in which the P-type transistor can be a PMOS transistor or a PNP BJT transistor.

Figure 6:
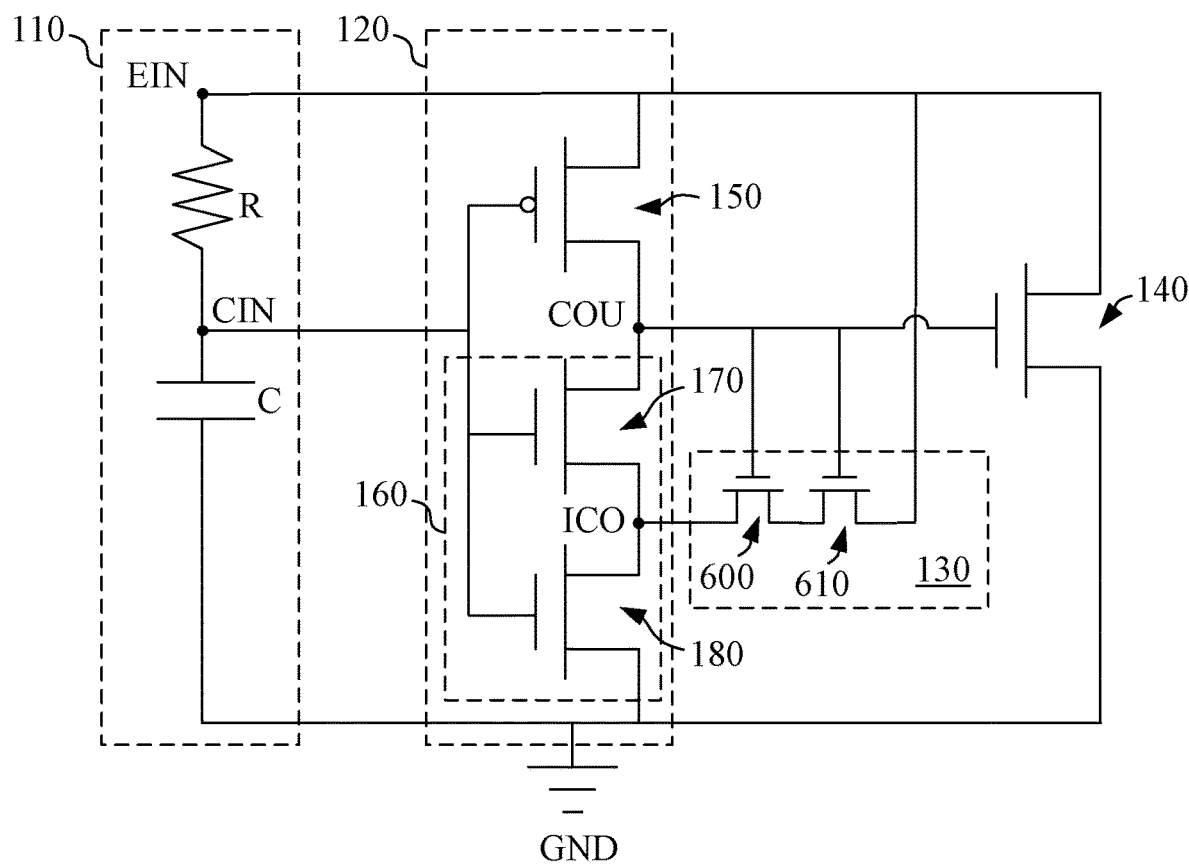
FIG. 6 illustrates a circuit diagram of the electrostatic discharge protection circuit having time-extended discharging mechanism according to another embodiment of the present invention.

Besides, in an embodiment, the switch transistor 130 may include a plurality of N-type transistors or P-type transistors electrically coupled in series and controlled by the output control terminal COU. Please refer to FIG. 6. FIG. 6 illustrates a circuit diagram of the electrostatic discharge protection circuit 100 having time-extended discharging mechanism according to another embodiment of the present invention. The electrostatic discharge protection circuit 100 also includes a RC circuit 110, an inverter 120, a switch transistor 130 and a discharging transistor 140. As illustrated in FIG. 6, the switch transistor 130 in the present embodiment includes two N-type transistors 600 and 610 electrically coupled in series.

Further, the number of the N-type transistors included in the N-type transistor circuit 160 in the embodiment illustrated in FIG. 1 is two. However, in other embodiments, the number of the N-type transistors included in the N-type transistor circuit 160 can be any number larger than two, and the internal connection terminal can be disposed in any two of the neighboring N-type transistors.

It is appreciated that the embodiments described above are merely an example. In other embodiments, it is appreciated that many modifications and changes may be made by those of ordinary skill in the art without departing, from the spirit of the invention.

In summary, the electrostatic discharge protection circuit having time-extended discharging mechanism, by disposing the switch transistor, can extend the time that the discharging transistor turns on when the state of the voltage level of the input control terminal of the RC circuit transits after the predetermined time. A longer time of the discharging activity performed on the ESD input terminal can be obtained.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An electrostatic discharge protection circuit having time-extended discharging mechanism comprising:
   a RC circuit electrically coupled between an ESD input terminal and a ground terminal and comprising an input control terminal, wherein a voltage level of the ESD input terminal is predetermined to be at a low state level and is configured to receive an ESD input;
   an inverter comprising:
      a P-type transistor electrically coupled between the ESD input terminal and an output control terminal; and
      an N-type transistor circuit comprising a plurality of N-type transistors electrically coupled in series between the output control terminal and the ground terminal, wherein two of the N-type transistors comprise an internal connection terminal, and a gate of each of the P-type transistor and the N-type transistors is controlled by the input control terminal;
   a switch transistor electrically coupled between the ESD input terminal and the internal connection terminal, wherein the switch transistor comprises a plurality of transistors electrically coupled in series; and
   a discharging transistor electrically coupled between the ESD input terminal and the ground terminal, wherein a gate of each of the switch transistor and the discharging transistor is controlled by the output control terminal.

2. The electrostatic discharge protection circuit of claim 1, wherein when the ESD input terminal receives the ESD input, the voltage level of the ESD input terminal increases from the low state level to a high state level and a voltage level of the input control terminal is kept to be at the low state level within a predetermined time so as to make a voltage level of the output control terminal increases to the high state level through the inverter;
   wherein the output control terminal turns on the switch transistor such that a voltage level of the internal connection terminal increases to the high state level to turn off the N-type transistor circuit to further keep the voltage level of the output control terminal at the high state level, and the output control terminal turns on the discharging transistor to discharge the ESD input terminal.

3. The electrostatic discharge protection circuit of claim 2, wherein the voltage level of the input control terminal increases to the high state level after the predetermined time, and the switch transistor is kept to be turned on to keep the voltage level of the internal connection terminal at the high state level so as to turn off the N-type transistor circuit, to keep the voltage level of the output control terminal at the high state level such that the discharging transistor turns on to discharge the ESD input terminal.

4. The electrostatic discharge protection circuit of claim 3, when the voltage level of the ESD input terminal is discharged to be at the low state level, the switch transistor fails to keep the internal connection terminal at the high state level such that the N-type transistor circuit turns on according to the input control terminal to decrease the voltage level of the output control terminal to the low state level to further turn off the discharging transistor and the switch transistor.

5. The electrostatic discharge protection circuit of claim 1, wherein the RC circuit comprises:
   a resistor electrically coupled between the ESD input terminal and the input control terminal; and
   a capacitor electrically coupled between the input control terminal and the ground terminal;
   wherein the predetermined time is determined by a time constant of the resistor and the capacitor.

6. The electrostatic discharge protection circuit of claim 5, wherein the resistor is a transistor resistor, a poly-Si resistor or an N-type well resistor.

7. The electrostatic discharge protection circuit of claim 5, wherein the capacitor is a metal-oxide-semiconductor capacitor, a metal-oxide-metal capacitor or a metal-insulator-metal capacitor.

8. The electrostatic discharge protection circuit of claim 1, wherein the discharging transistor comprises an N-type transistor or a P-type transistor electrically coupled to the output control terminal through an additional inverter.

9. The electrostatic discharge protection circuit of claim 1, wherein the switch transistor comprises an N-type transistor or a P-type transistor electrically coupled to the output control terminal through an additional inverter.

* * * * *